Patented Feb. 5, 1946

2,394,279

UNITED STATES PATENT OFFICE 2,394,279

PREPARATION OF 2:3-HYDROXY NAPHTHOIC ARYLIDES

Robert H. Weiss, Plainfield, and Andrews C. Wintringham, Glen Ridge, N. J., assignors to American Cyanamid Company, New York, N. Y., a corporation of Maine No Drawing. Application December 19, 1942, Serial No. 469,574

10 Claims. (Cl. 260—560)

This invention relates to a new improved process of preparing arylides of 2:3-hydroxy naphthoic acid.

2:3-hydroxy naphthoic acid arylides which are an important group of compounds used as coupling components in azo dyes are usually prepared by reacting beta oxy naphthoic acid with the corresponding aromatic amine, an inert organic solvent such as toluene or monochlorbenzene, using phosphorus trichloride or thionyl chloride as a condensing agent. In many cases serious operating difficulties are encountered because the reaction mixture becomes very thick, especially during certain stages while the condensation agent is being added, so that effective agitation, particularly with propeller type agitators, is practically impossible. The lack of proper agitation results in side reactions, increased formation of tar, poor quality of product, and often lower yields. Another disadvantage is that filtration and washing is also made more difficult because of the physical form of the product.

It has been proposed to overcome the high viscosity of the reaction mixture by a great increase in the amount of inert organic solvent used. Of course, if sufficient solvent is employed a thin mixture can be obtained, but this solution of the problem is not practical because the disadvantages overweigh the advantages. Among the principal disadvantages are greatly decreased output with corresponding increase in fixed costs, large increase in the amount of solvent which has to be recovered and a considerable loss in yield when the arylide is isolated by cooling and filtering because of the solubility of the arylide in a large amount of solvent.

The present invention solves the difficulties encountered due to thickening and at the same time is not subject to the disadvantages of large solvent excesses. According to the present invention a small amount of a surface active agent such as a wetting agent is added to the reaction mixture before introducing the condensing agent. The reaction mixture remains quite fluid and easily stirrable even with a propeller type agitator. Tar formation is decreased, and when the charge is filtered much more rapid and ready filtration and washing result as the product appears to be more definitely and uniformly crystalline. The melting point of the product obtained is higher and it dissolves in alkali completely, producing a lighter colored solution.

The precise mechanism of the present invention has not been fully determined, but it has no relation to any solvent action of the surface active agent because the latter is used in extremely small amounts, and it seems probable that the action is purely a surface action.

While it is not desired to limit the invention to particular individual surface active agents, there is a considerable difference in the efficiency of different classes of surface active agents, and even between different members of the same group, and we have found that surface active agents of the following types are particularly useful:

1. Alkyl esters of the salts of aliphatic sulfopolycarboxylic acid, such as dioctyl sodium sulfosuccinate, diisobutyl sodium sulfosuccinate, diamyl sodium sulfosuccinate, dimethylamyl sodium sulfosuccinate.

2. Alkyl naphthalene sulfonate, such as sodium isopropylnaphthalene sulfonate, sodium isobutylnaphthalene sulfonate, and the like.

3. Sodium salts of alkyl sulfuric acids, such as sodium lauryl sulfate, sodium oleyl sulfate, and the like.

4. Condensation products of long chain acids with amino sulfonic acids such as methyl taurine, for example the condensation product of oleic acid with methyl taurine.

5. Sulfated glyceride oils, such as sulfated castor oil.

6. Alkyl phenol sulfonates.

7. Quaternary salts of higher acyl diamines.

It is an advantage that improved products are obtained by the present invention without increasing the cost of the product and actually with a marked decrease because of higher yields, the amount of surface active agent required being so small as to represent little expense.

The invention will be described in greater detail in conjunction with the following specific examples.

Example 1

188 parts of beta hydroxynaphthoic acid, 138 parts of metanitraniline and 1800 parts of monochlorbenzene were introduced into a vessel equipped with an agitator and condenser and the mixture heated to 70° C., whereupon 55 parts of phosphorus trichloride were slowly run in. During the phosphorus trichloride addition the charge became quite thick and did not stir well, and after all of the phosphorus trichloride had been added the charge was heated to the refluxing point and remained quite thick during the early stages of the heating, gradually thinning out as the heating progressed. After several hours of refluxing the charge become a fluid dark greenish-yellow slurry with a black deposit of tar on the walls of the vessel. The charge was then cooled to room temperature and filtered, the arylide filtering and washing slowly. After the excess of the beta hydroxynaphthoic acid and amine was removed from the filter cake it was dried and ground and a product was obtained which melted at 247–249° C.

Example 2

The procedure of Example 1 was followed except that 0.45 part by weight of sodium dioctylsufosuccinate was added to the reaction mixture before introducing the phosphorus trichloride.

The charge remained fluid during the addition of phosphorus trichloride, stirred readily and gave a smooth reaction. During the heating under reflux the charge remained much thinner throughout than in the case of Example 1. After reaction was complete the mixture was considerably brighter in color and there was much less black tar adhering to the walls of the reaction vessel.

The arylide obtained by filtration was more crystalline in structure, washed and filtered more readily, and a materially increased yield of a product melting at 249–249.5° C. was obtained.

Example 3

The procedure of Example 2 was followed but the amount of sodium dioctylsulfosuccinate was increased to 4 parts. Fluidity of the charge during the addition of phosphorus trichloride was materially increased as well as the fluidity during the period of reflux. A much brighter condensation product was obtained with very little black tar adhering to the walls of the reaction vessel.

The arylide recovered by filtration was much lighter in color and was of more uniformly crystalline structure, filtering and washing very readily, the product melting at 249.5–250° C.

Example 4

The procedure of Example 2 was followed but sodium diisobutylsulfosuccinate was substituted for the sodium dioctylsulfosuccinate. The thinning effect was substantially the same and a product of the same high degree of purity was obtained in excellent yield.

Example 5

The procedure of Example 2 was followed but the sodium dioctylsulfosuccinate was replaced by a corresponding amount of sodium salt of diisopropylnaphthalene sulfonic acid. The results were substantially the same and a high yield of very pure product was obtained.

Example 6

The procedure of Example 2 was followed, replacing the sodium diisobutylsulfosuccinate with a corresponding amount of the condensation product of oleic acid with methyltaurine. Similar improved results were obtained.

Example 7

The procedure of Example 2 was followed but instead of the sodium dioctylsulfosuccinate a corresponding amount of the sodium salt of sulfonated castor oil was used. The same improved results were obtained.

Example 8

188 parts of beta hydroxy-naphthoic acid, 143 parts of alpha naphthylamine and 1800 parts of monochlorbenzene were introduced into a reaction vessel equipped with an agitator and condenser and the mixture was heated to 70° C. and 55 parts of phosphorus trichloride were slowly added. The charge became very thick when half of the phosphorus trichloride had been added and remained so thick that satisfactory agitation was not obtainable. After all of the phosphorus trichloride was added the reaction was heated under reflux until reaction was complete. The charge was then cooled slightly and neutralized by running into an aqueous solution of sodium bicarbonate. After cooling to room temperature the charge was filtered and purified by washing. A product was obtained melting at 216–217° C.

Example 9

The procedure of Example 8 was followed except that 0.4 part of sodium dioctylsulfosuccinate was added to the reaction mixture before the addition of the phosphorus trichloride.

The charge remained fluid and easily stirrable throughout the whole reaction and the arylide separated out in a coarse sandy form free from tarry impurities. Filtration and washing were very rapid and after drying a product was obtained which melted at 221–222° C., the yield being excellent.

Example 10

188 parts of beta hydroxynaphthoic acid, 135 parts of para chloraniline and 1800 parts of monochlorbenzene were introduced and the mixture heated to 70° C. 55 parts of phosphorus trichloride were then added slowly, the charge becoming very thick during the addition so that agitation was inefficient. After all of the phosphorus trichloride had been added the charge was refluxed until reaction was completed, cooled to room temperature and filtered. After washing the filter cake to remove excess beta hydroxynaphthoic acid and amine it was dried and a product obtained melting at 257.5–258° C.

Example 11

The procedure of Example 10 was followed except that 0.5 part of sodium dioctylsulfosuccinate was added to the reaction mixture before introducing the phosphorus trichloride.

The charge remained easily stirrable throughout the entire reaction, and the arylide separating from the solution in an easily filtered form. The dry product obtained melted at 263–264° C. The yield was excellent.

Example 12

The procedure of Example 11 was followed but the sodium dioctylsulfosuccinate was replaced by a corresponding amount of sodium diamylsulfosuccinate. The results obtained were substantially the same.

Example 13

The procedure of Example 11 was followed but the sodium dioctylsulfosuccinate was replaced by a corresponding amount of sodium salt of lauryl sulfuric acid. Comparable results were obtained.

Example 14

The procedure of Example 11 was followed but the sodium dioctylsulfosuccinate was replaced by a corresponding amount of sodium salt of an alkyl phenol sulfonate sold in the trade under the name "Nacconal NR." The results were comparable with those obtained in Example 10.

Example 15

The procedure of Example 2 was followed but the sodium dioctylsulfosuccinate was substituted by 4 parts of a surface active agent known in the trade as "Sapamine KW." The Sapamine wetting agents are quaternary salts of higher acyl diamines, Sapamine KW being the quaternary salt of beta diethylaminoethyl oleyl amide. The thinning effect was substantially the same as in Example 3 and a high yield was obtained of a product melting at 248.5–250° C.

We claim:

1. In the preparation of 2:3-hydroxy naphthoic acid arylides by reacting beta hydroxy naphthoic acid with the corresponding aromatic amine in an inert organic solvent in the presence of a condensing agent, the improvement which comprises carrying out the condensation in the presence of a small amount of a surface active agent and washing the product substantially free from surface active agent.

2. In the preparation of 2:3-hydroxy naphthoic acid arylides by reacting beta hydroxy naphthoic acid with the corresponding aromatic amine in an inert organic solvent in the presence of phosphorus trichloride, the improvement which comprises carrying out the condensation in the presence of a small amount of a surface active agent and washing the product substantially free from surface active agent.

3. In the preparation of 2:3-hydroxy naphthoic acid arylides by reacting beta hydroxy naphthoic acid with the corresponding aromatic amine in an inert organic solvent in the presence of a condensing agent, the improvement which comprises carrying out the condensation in the presence of a small amount of a surface active agent belonging to the group consisting of alkali metal salts of organic sulfonic acids and alkali metal salts of acid esters of sulfuric acid and washing the product substantially free from surface active agent.

4. In the preparation of 2:3-hydroxy naphthoic acid arylides by reacting beta hydroxy naphthoic acid with the corresponding aromatic amine in an inert organic solvent in the presence of phosphorus trichloride, the improvement which comprises carrying out the condensation in the presence of a small amount of a surface active agent belonging to the group consisting of alkali metal salts of organic sulfonic acids and alkali metal salts of acid esters of sulfuric acid and washing the product substantially free from surface active agent.

5. In the preparation of 2:3-hydroxy naphthoic acid arylides by reacting beta hydroxy naphthoic acid with the corresponding aromatic amine in an inert organic solvent in the presence of a condensing agent, the improvement which comprises carrying out the condensation in the presence of an alkyl ester of a sulfosuccinate and washing the product substantially free from surface active agent.

6. In the preparation of 2:3-hydroxy naphthoic acid arylides by reacting beta hydroxy naphthoic acid with the corresponding aromatic amine in an inert organic solvent in the presence of phosphorus trichloride, the improvement which comprises carrying out the condensation in the presence of an alkyl ester of a sulfosuccinate and washing the product substantially free from surface active agent.

7. In the preparation of 2:3-hydroxy naphthoic acid arylides by reacting beta hydroxy naphthoic acid with the corresponding aromatic amine in an inert organic solvent in the presence of a condensing agent, the improvement which comprises carrying out the condensation in the presence of dioctyl sodium sulfosuccinate and washing the product substantially free from surface active agent.

8. In the preparation of 2:3-hydroxy naphthoic acid arylides by reacting beta hydroxy naphthoic acid with the corresponding aromatic amine in an inert organic solvent in the presence of phosphorus trichloride, the improvement which comprises carrying out the condensation in the presence of dioctyl sodium sulfosuccinate and washing the product substantially free from surface active agent.

9. In the preparation of 2:3-hydroxy naphthoic acid arylides by reacting beta hydroxy naphthoic acid with the corresponding aromatic amine in an inert organic solvent in the presence of a condensing agent, the improvement which comprises carrying out the condensation in the presence of a sodium salt of a long chain alkyl sulfuric acid and washing the product substantially free from surface active agent.

10. In the preparation of 2:3-hydroxy naphthoic acid arylides by reacting beta hydroxy naphthoic acid with the corresponding aromatic amine in an inert organic solvent in the presence of phosphorus trichloride, the improvement which comprises carrying out the condensation in the presence of a sodium salt of a long chain alkyl sulfuric acid and washing the product substantially free from surface active agent.

ROBERT H. WEISS.
ANDREWS C. WINTRINGHAM.